United States Patent

Saunders, IV

[11] 4,262,959
[45] Apr. 21, 1981

[54] HEADLIGHT GLARE SHIELD FOR USE WITH SLOTTED FAIRING

[76] Inventor: Charles A. Saunders, IV, P.O. Box 1246, Columbus, Nebr. 68601

[21] Appl. No.: 24,954

[22] Filed: Mar. 29, 1979

[51] Int. Cl.³ .............................................. B62J 17/02
[52] U.S. Cl. ............................... 296/78.1; 280/289 S; 362/72
[58] Field of Search ................. 296/78.1; 362/72, 376; 280/289 S

[56] References Cited

U.S. PATENT DOCUMENTS 3,922,031  11/1975  Hugon .................................. 296/78.1

Primary Examiner—David M. Mitchell
Assistant Examiner—John A. Carroll
Attorney, Agent, or Firm—Edwin L. Spangler, Jr.

[57] ABSTRACT

This invention relates to a glare shield for motorcycle headlights mountable within an inverted generally U-shaped slot in a transparent fairing placed in front thereof, the shield being characterized by an elongate web of flexible elastic material having a center section bordered on both ends by arcuate pleated sections separating the latter from a pair of identical end sections bearing an acute angular relationship to the center section approaching 90°. The shield also includes an integrally-formed rim on the outside of the web having a more or less H-shaped cross section adapted to be releasably retained in forwardly-facing flush relation within an inverted and recessed U-shaped slot in the fairing that extends along the top of the headlight and down along both sides thereof. The pleats are located on top of the web in upstanding relation thus leaving the underside with flat wedge-shaped surfaces between the pleats that engage the headlight and block most of the reflected light therefrom. The invention also encompasses the improved combination between the shield and fairing that eliminates the need for a detachable insert in the latter while, at the same time, maintaining a smooth uninterrupted aerodynamic surface.

13 Claims, 7 Drawing Figures

U.S. Patent    Apr. 21, 1981    4,262,959
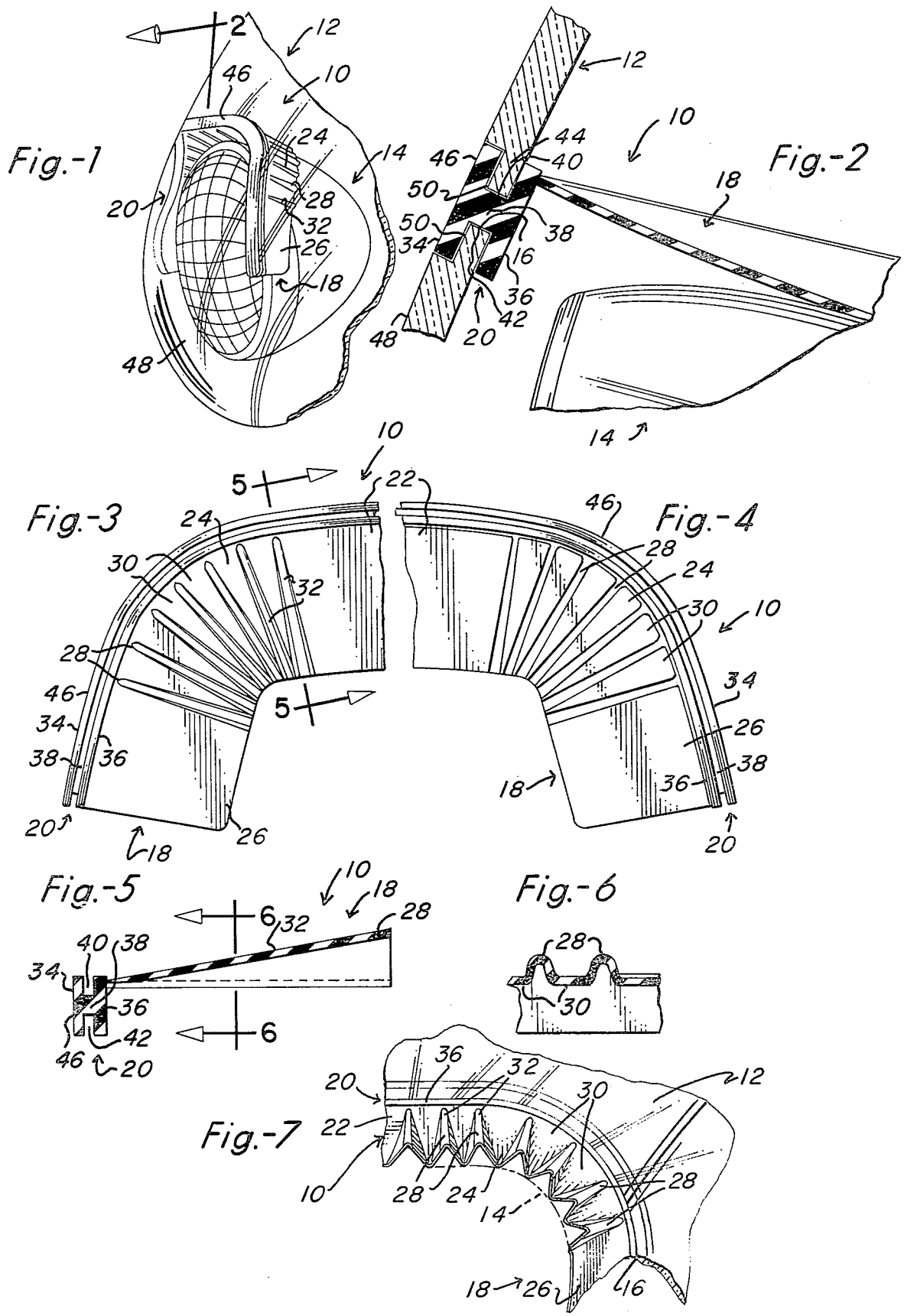

HEADLIGHT GLARE SHIELD FOR USE WITH SLOTTED FAIRING

Motorcycle headlights mounted behind transparent fairings have long been recognized as a source of serious reflections which impair the rider's vision and prevent him or her from seeing the road ahead. Also, the brilliance of these reflections is such that they cause the rider's pupils to contract and further limit one's ability to see properly. In addition to these reflections, the fiberoptic effect of some plastic fairings causes light to emerge from the edges of the fairing and around openings therein that is both distracting and detrimental to good night vision.

Up until now, the most satisfactory solution to the problem has been that exemplified by Hugon's U.S. Pat. No. 3,922,031 wherein a tubular rubber boot is fastened within a circular opening in the fairing. The boot extends rearwardly into encircling relation around the front end of a bullet-shaped headlight so as to completely envelop the light beam thrown forwardly by the latter. If desired, a snap-in bubble complementing the contoured fairing surface can be inserted inside the boot at the front end thereof.

While basically satisfactory, the Hugon fairing and light-trapping boot assembly has proven to have certain shortcomings that render it less than entirely adequate for its intended use. To begin with, it works best with round headlights notwithstanding the fact that rectangular ones are becoming increasingly popular on many well-known motorcycles. Secondly, and most important, its tubular configuration demands that a hole as opposed to a slot be cut in the fairing; whereas, extensive tests made by applicant have revealed that the bottom of the headlamp and even the lower portions on each side thereof need not be shielded to produce a virtually non-reflective and glare-free assembly. This means, of course, that the unitary integrity of the fairing can be maintained since an inverted U-shaped slot is all that is needed to receive and retain the light shield. Finally, the circular head bordering the front edge of the boot that projects forwardly from the front surface of the Hugon fairing is aerodynamically poor in that it creates turbulence as the air flows over an otherwise smooth and well-contoured windscreen.

It has now been found in accordance with the teaching of the instant invention that these and other shortcomings of the Hugon light-trapping boot can, in fact, be overcome by the simple, yet unobvious, expedient of merely draping the light-trapping shield across the top and at least part way down the sides of the headlamp while leaving the bottom unshielded. This approach, as previously noted, enables one to preserve the unitized structure of the fairing since only an inverted U-shaped slot is needed to retain the shield. Also, by recessing the slot within a somewhat wider groove in the front face of the fairing, it becomes a simple matter to fill the groove with a rim bordering the shield so as to restore the aerodynamic integrity by keeping the front edge of the shield flush with the adjacent fairing surfaces.

The construction of the shield is such that when formed into the arched hood-forming configuration, the elasticity of the unit together with its pleated corner sections cooperate to bias it into light-tight sealed contact with the adjacent headlight surfaces therebeneath and alongside thereof. Equally important is the construction of the pleated sections themselves, each consisting of a series of more or less radially-extending upstanding pleats separated from one another by generally wedge-shaped connecting surfaces. These connecting surfaces cooperate with one another to define broad contourable areas adapted to mate with the adjacent headlight surfaces and produce the necessary light seal which the pleats could not do if folded inwardly because their folded edges would hold the connecting areas away from the headlight and permit light to leak therebetween.

It is, therefore, the principal object of the present invention to provide a novel and improved glare shield for use with a slotted fairing to control the reflected light from a motorcycle headlight.

A second object is the provision of a device of the type aforementioned which is used in combination with a fairing having a recessed slot therein to produce an aerodynamically smooth wind-receiving surface.

Another objective of the within described invention is that of providing a glare shield with pleated corner sections which are so designed and constructed that they maintain the light-tight integrity of the shield despite the presence of the folds.

Still another objective is to provide a glare-eliminating hood which is equally adaptable for use with either bullet-shaped or rectangular headlights.

An additional object is the provision of a light shield and fairing combination that maintains the unitized structure of the fairing.

Further objects of the instant invention are to provide a glare shield which is simple, inexpensive, versatile, lightweight, rugged, easy to install, effective and even decorative in appearance.

Other objects will be in part apparent and in part pointed out specifically hereinafter in connection with the description of the drawings that follows, and in which:

FIG. 1 is a fragmentary perspective view showing the shield mounted within the recessed inverted U-shaped slot in the fairing and positioned to form a hood across the top and down both sides of the headlight;

FIG. 2 is a fragmentary section to a greatly enlarged scale taken along line 2—2 of FIG. 1;

FIG. 3 is a fragmentary top plan view of the symmetrical shield to a scale a good deal smaller than FIG. 2 showing approximately the left half of the unit;

FIG. 4 is a fragmentary bottom plan view of the shield to the same scale as FIG. 3 but showing approximately the right half of the unit;

FIG. 5 is a section to a scale between that of FIG. 2 and FIGS. 3 and 4 taken along line 5—5 of FIG. 3;

FIG. 6 is a fragmentary section to approximately the same scale as FIG. 5 taken along line 6—6 of FIG. 5; and, FIG. 7 is a fragmentary perspective view looking directly at the upper right-hand corner of the shield shaped as in FIG. 1 from a point inside the fairing, the scale being approximately that of FIG. 3.

Referring next to the drawings for a detailed description of the present invention and, initially, to FIGS. 1 and 2 for this purpose, reference numeral 10 has been employed to broadly designate the glare shield forming the subject matter hereof which numerals 12 and 14 have been used in like manner to designate the transparent fairing and the headlight, respectively, of the three-part assembly. The fairing is molded of transparent plastic and, with the exception of slot 16 therein which will be described in detail presently, it generally conforms in overall shape to that which is shown in my U.S. Pat. Des. No. D 248,940 although the shield 10 to which this application is addressed is, by no means restricted, to use with a fairing of this design or construction. Instead, it can readily be adapted for use with any number of other windscreen designs wherein the headlight is placed behind and must shine through the latter thus creating glare and reflection problems.

Headlight 14 is shown as being generally bullet-shaped, this shape being one that is very widely used on motorcycles. Be that as it may, the shield of the present invention can also be used with square and rectangular headlights with good results since its flexibility will easily adjust to accommodate these different shapes and others.

Before describing how the shield is mounted within the slot 16 in the fairing for which purpose reference will, once again, be made to FIGS. 1 and 2, it will be best to first describe the shield itself and, in so doing, reference will be had to FIGS. 3-6, inclusive. The shield 10 is molded in one piece from a flexible elastic material such as, for example, natural or synthetic rubber. Even though the shield is bent into the form of an arch (see FIG. 1) when in use, it is preferably molded flat to simplify the die and also to provide the unit with the desired bias or "set" that causes it to conform closely with the adjacent surfaces of the headlight to produce an essentially light-tight seal therewith. For purposes of the present description, the shield 10 will be considered as having a web portion and a rim portion which have been broadly designated by reference numerals 18 and 20, respectively, the web 18 portion in plan view can be considered to have an inverted U-shape with the rim 20 bordering only the outside edge of the latter. The web is symmetrical and is divided into three flat flap-like sections separated by two pleated corner sections. One flat section 22 extends across the top and, for present purposes, will be referred to henceforth as the "center section" of the web since this is the position it occupies. Connected to this center section on both ends are the pleated corner sections 24, each of which defines a corner of something less than 90° in angular extent, the ones illustrated being probably somewhere between 75° and 80° although this is not critical. The remaining flat sections 26 are identical and they connect onto the remote end of the corner sections 24 defining the downturned flaps of the web, both in the flat configuration of FIGS. 3 and 4 as well as in the shaped arch-forming hood-like configuration of FIG. 1.

Now, ignoring the rim 20 for the moment, it is significant that prior to being shaped, the web portion 18 will essentially lay flat upon a planar supporting surface. In order to do so, of course, all the pleats 28 of the pleated sections 24 must rise from one face of the web, specifically the top surface thereof. Looking at this aspect of the shield another way, the web 18 does not emanate from the middle of the pleats, but rather, at the base thereof as is most clearly revealed in FIG. 6. The pleats 28 diverge more or less radially from a common center about which the pleated corner sections 24 are curved thus leaving wedge-shaped segments 30 therebetween. These wedge-shaped segments between the pleats are essentially coplanar with the other flat sections 22 and 26 of the web and they cooperate with these sections to engage the surface of the headlight in the manner shown in FIGS. 1 and 7 to produce the light-tight seal. Note also in connection with FIG. 5 that the pleats 28 taper outwardly toward the rim, so much in fact that they disappear altogether as they approach the outer margin of the web 22. This means, of course, that the pleats, even when stretched open as shown in FIG. 7, leave very little in the way of a tunnel for the escape of reflected light back to the driver. If, on the other hand, the web emanated from the top of the pleats, this being a situation analogous to turning the shield upside down, then the folded edges 32 of the pleats would rest atop the headlight case and hold the web in spaced relattion thereto thus creating wide open passages for the escape of reflected light back to the driver.

More specifically on this point, reference to FIG. 7 will reveal the nature of the surface presented to the headlight underneath the pleated corners of the sheet. It consists generally of the underside of the wedge-shaped segments 30 arranged in fan-shaped juxtaposition to one another cooperating to define a broad contoured area effective to seal out all but the dimmest of reflections escaping along the pleats.

Returning again to FIGS. 3, 4 and 5, the rim 20 will be seen to extend from end-to-end of the web portion 22 and have a generally H-shaped cross section defined by an outer flange 34, on inner flange 36 and a connecting web 38 therebetween. The top and bottom-opening slots 40 and 42, respectively, in the rim (FIG. 5) between the flanges thereof receive the margins 44 (FIG. 2) of the fairing that border slot 16 therein. The exposed face 46 of the outer or front flange 34 of the rim 20 is smooth surfaced and cooperates with the corresponding surface 48 of the fairing itself to restore the aerodynamic properties of the screen.

It will be apparent from a comparison of FIGS. 1 and 3 that the rim 20 must be rotated a little less than a quarter of a turn from its relayed position (FIG. 3) in order for the oppositely-opening slots 40 therein to be in position to receive the marginal portions 40 bordering slot 16. Once the shield is in place as shown in FIG. 1, the twisting of the rim leaves the web 18 actually hanging in curtain-like fashion from the slot. In other words, it is only when the shell of the headlight is placed inside the shield that it expands and assumes the cowl-like configuration that forms a hood or shroud over the top and down both sides of the headlamp. This slot 16 is recessed rearwardly in a groove 50 that extends both above and below the latter as well as beyond the ends thereof. Its depth, size and shape is precisely that of front rim flange 34 which is received therein as shown in flush relation. The configuration of the rear rim flange 36 is of little importance since its primary function is that of cooperating with the front one and connecting web 38 therebetween to hold the rim seated with recessed slot 16.

Now, as previously mentioned, once the rim 20 of the shield is seated within the recessed groove 16 in the fairing, the web portion 18 thereof drapes more or less curtain-like from the slot until it is expanded into hood-forming relation by insertion of the headlight shell. Once thus expanded, the pleated sections cooperate with one another and with the adjoining flap sections to normally bias the web defined thereby into essentially light-tight sealed engagement with the headlight shell as shown in FIG. 1. Moreover, this biasing action is effective to shape the web to fit various headlight shell contours.

The inverted U-shaped cowl or hood over the top and down along both sides of the headlamp thus produced is quite effective to eliminate all unwanted glare and reflections from the headlamp since the driver's eyes lie well above the latter. Any reflected light escaping beneath the shield is of no consequence. Also, the fiberoptic effect resulting from the partially open sides of the shield produces at most a dim glow along the sides of the fairing that tell the driver its limits at night without, at the same time, effecting his night vision.

What is claimed is:

1. A glare shield for use with a transparent handlebar-mounted motorcycle windscreen to prevent light reflected from a headlight positioned therebehind from interfering with the driver's vision which comprises: a sheet of opaque flexible material shaped to provide flap-like center and end portions connected together by pleated corner sections cooperating to define a generally U-shaped web bordered by inside and outside margins, the pleated corner sections diverging radially from said inside to said outside margin while coacting with one another to permit placement of said outside margin of the web against the driver's side of the windscreen in an inverted U-shaped arch and to further allow rearrangement of the flap-like portions into a tunnel-like hood extending across the top and down both sides of the headlight from a normal substantially coplanar relationship.

2. The glare shield as set forth in claim 1 wherein the outside margin of the web is bordered by a peripherally-grooved rib adapted for detachable connection in an inverted U-shaped slot in the windscreen.

3. The glare shield as set forth in claim 1 wherein the pleats in the corner sections are normally closed, said pleats opening upon rearrangement of the flaps into their hood-forming configuration, and said pleats functioning when open to bias the flap-like portions into essentially light-tight sealed engagement with the opposed headlight surfaces shrouded thereby.

4. The glare shield as set forth in claim 1 wherein the pleats in the pleated sections are separated from one another by wedge-shaped connecting portions that diverge from the inside margin of the web to the outside margin thereof.

5. The glare shield as set forth in claim 2 wherein the marginal rib has a generally H-shaped cross section defined by spaced substantially parallel outside and inside flanges and a connecting web therebetween, said outside flange being shaped to restore the outside contour of a windscreen upon being recessed within a forwardly-facing groove bordering the U-shaped slot when the latter contains the connecting web.

6. The glare shield as set forth in claim 2 wherein the pleats all lie on the same side of the plane defined by the flap-like portions.

7. The glare shield as set forth in claim 3 wherein each pleat has a centerfold and marginal folds on both sides of said centerfold, and wherein said marginal and centerfold merge at a common point adjacent the outside margin of the web.

8. The glare shield as set forth in claim 4 wherein the wedge-shaped connecting portions between the pleats normally lie in substantially coplanar relation to the flap-like portions.

9. The glare shield as set forth in claim 6 wherein the pleats lie on the outside of the shield when the flap-like portions are placed in hood-forming relation.

10. The glare shield as set forth in claim 7 wherein the centerfold of each pleat slopes from a high point adjacent the inside margin of the web to a low point adjacent its outside margin.

11. In combination: a transparent windscreen having a forwardly-facing contoured surface containing an inverted generally U-shaped slot bordered by a groove, and a glare shield comprising a flexible flap of opaque material formed into a tunnel-like hood adapted to extend across the top and down along both sides of a headlight disposed behind the windscreen, said flap having a front edge bordered by a flange sized and shaped to enter the recess defined by the groove bordering the slot in the windscreen so as to restore the contour to the latter when said web is passed through the slot therein.

12. The combination of claim 11 wherein the flap is comprised of generally planar midsection joined to end sections disposed in acute angular relation thereto by pleated corner sections.

13. The combination of claim 12 wherein the flap includes a second flange spaced behind the first cooperating therewith to seal the windscreen therebetween.

* * * * *